US012463257B2

United States Patent
Sato et al.

(10) Patent No.: US 12,463,257 B2
(45) Date of Patent: Nov. 4, 2025

(54) LIQUID-TYPE LEAD STORAGE BATTERY

(71) Applicant: The Furukawa Battery Co., Ltd., Yokohama (JP)

(72) Inventors: Atsushi Sato, Iwaki (JP); Shinya Suge, Fukushima (JP); Hideki Hagihara, Iwaki (JP)

(73) Assignee: The Furukawa Battery Co., Ltd., Yokohama (JP)

( * ) Notice: Subject to any disclaimer, the term of this patent is extended or adjusted under 35 U.S.C. 154(b) by 573 days.

(21) Appl. No.: 18/013,395

(22) PCT Filed: Apr. 30, 2021

(86) PCT No.: PCT/JP2021/017267
§ 371 (c)(1),
(2) Date: Dec. 28, 2022

(87) PCT Pub. No.: WO2022/004120
PCT Pub. Date: Jan. 6, 2022

(65) Prior Publication Data
US 2023/0282889 A1  Sep. 7, 2023

(30) Foreign Application Priority Data

Jun. 30, 2020 (JP) .................................. 2020-113457

(51) Int. Cl.
*H01M 10/06* (2006.01)
*H01M 4/14* (2006.01)
(Continued)

(52) U.S. Cl.
CPC ............. *H01M 10/06* (2013.01); *H01M 4/14* (2013.01); *H01M 4/48* (2013.01); *H01M 4/68* (2013.01);
(Continued)

(58) Field of Classification Search
CPC .. H01M 10/06; H01M 10/0486; H01M 10/08; H01M 10/12; H01M 4/14;
(Continued)

(56) References Cited

U.S. PATENT DOCUMENTS 4,221,852 A * 9/1980 Qureshi .................. H01M 4/73
429/211
2011/0305957 A1 12/2011 Wakatabe et al.
(Continued)

FOREIGN PATENT DOCUMENTS

AU    2017235920 A1    4/2018
CN    105762422 A      7/2016
(Continued)

OTHER PUBLICATIONS

International Search Report in PCT/JP2021/017267, mailed Jun. 22, 2021, and its English translation, 4 pgs.
International Preliminary Report on Patentability in PCT/JP2021/017267, with its English translation, transmitted Jan. 12, 2023, 11 pgs.
Chinese Office Action issued in corresponding application No. 202180037053.9 with its English translation, dated Jun. 27, 2025, 14 pgs.

*Primary Examiner* — Eugenia Wang
(74) *Attorney, Agent, or Firm* — Young Basile Hanlon & MacFarlane, P.C.

(57) ABSTRACT

A liquid-type lead storage battery includes a positive electrode collector formed of a lead alloy having a rolled structure. A grid substrate of the collector has an upper frame bone located on the upper side and a lower frame bone located on the lower side, each extending laterally, and a pair of vertical frame bones extending vertically. A lug projects upward from a position shifted to the side close to either one of the pair of vertical frame bones from the longitudinal center of the upper frame bone. The intermediate bones have vertical intermediate bones from the upper to lower frame bone and lateral intermediate bones connecting the pair of vertical frame bones. At least one of the lateral intermediate bones has a cross-sectional area B larger than an average
(Continued)

value A of the cross-sectional areas of the plurality of lateral intermediate bones, such that B/A is 1.15 or more.

15 Claims, 4 Drawing Sheets

(51) Int. Cl.
| | |
|---|---|
| *H01M 4/48* | (2010.01) |
| *H01M 4/68* | (2006.01) |
| *H01M 4/73* | (2006.01) |
| *H01M 10/04* | (2006.01) |
| *H01M 10/08* | (2006.01) |
| *H01M 10/12* | (2006.01) |

(52) U.S. Cl.
CPC ............ *H01M 4/685* (2013.01); *H01M 4/73* (2013.01); *H01M 10/0486* (2013.01); *H01M 10/08* (2013.01); *H01M 10/12* (2013.01)

(58) Field of Classification Search
CPC .......... H01M 4/48; H01M 4/68; H01M 4/685; H01M 4/73; H01M 4/20; H01M 4/74; H01M 50/54; Y02E 60/10
See application file for complete search history.

(56) References Cited

U.S. PATENT DOCUMENTS

| | | | |
|---|---|---|---|
| 2014/0356727 A1* | 12/2014 | Nouzuka | H01M 4/73 29/2 |
| 2019/0393512 A1 | 12/2019 | Bose et al. | |
| 2020/0227758 A1 | 7/2020 | Kawaguchi et al. | |

FOREIGN PATENT DOCUMENTS

| | | |
|---|---|---|
| CN | 210866358 U | 6/2020 |
| JP | H07-235307 A | 9/1995 |
| JP | 2002-042821 A | 2/2002 |
| JP | 2014-235844 A | 12/2014 |
| JP | 2016-126924 A | 7/2016 |
| JP | 2018-60629 A | 4/2018 |
| JP | 6456537 B1 | 1/2019 |
| JP | 2019-067522 A | 4/2019 |
| JP | 2019-153384 A | 9/2019 |
| WO | 2010/073588 A1 | 7/2010 |
| WO | 2018/140713 A1 | 8/2018 |

\* cited by examiner

LIQUID-TYPE LEAD STORAGE BATTERY

TECHNICAL FIELD

Embodiments of the present invention relate to a liquid-type lead storage battery.

BACKGROUND

To address the seriousness of environmental problems and emission control in recent years, vehicles mounted with an idling stop system (ISS) (hereinafter referred to as "ISS vehicles") are becoming widespread. The ISS vehicles stop the engine when stopped at a traffic light or the like to suppress fuel consumption, and therefore can improve fuel efficiency and further can reduce emission amounts.

It is known that a respective lead storage battery mounted in the ISS vehicles described above tends to have a short life. The reasons therefor are as follows. In the ISS vehicles, the lead storage battery is used up to a deep discharge depth to supply power to equipment, such as air conditioners, lights, wipers, and car navigation systems, when the engine stops due to the stop at a traffic light, for example. Further, the discharge for restarting the engine in starting and the charge by an alternator or a regenerative brake are repeated. Due to these severe uses, the lead storage battery is seriously damaged particularly in power generation elements.

In a common liquid-type lead storage battery, an electrode plate group serving as the power generation element has a laminate containing a plurality of positive electrode plates and negative electrode plates arranged alternately and separators arranged between adjacent ones of the positive electrode plates and the negative electrode plates. The positive electrode plate has a positive electrode current collector and a positive electrode mixture containing a positive electrode active material. The positive electrode active material contains lead dioxide. The positive electrode current collector has a rectangular grid substrate and a lug (also referred to as a "current collecting lug") continuous to the grid substrate. The positive electrode mixture is held in the grid substrate. The lugs of the plurality of positive electrode plates are connected with a positive electrode strap.

The negative electrode plate has a negative current collector and a negative electrode mixture containing a negative electrode active material. The negative electrode active material contains metallic lead. The negative current collector has a rectangular grid substrate and a lug continuous to the grid substrate. The negative electrode mixture is held in the grid substrate. The lugs of the plurality of negative electrode plates are connected with a negative electrode strap. The positive electrode current collector and the negative current collector mainly contain lead or a lead alloy.

An example of the grid substrate includes a grid substrate structured to have frame bones forming the four sides of the rectangle and a plurality of intermediate bones connected to the frame bones and present inside the frame bones. In the grid substrate having the structure, the frame bones have an upper frame bone located on the upper side of the grid substrate and extending in the lateral direction, a lower grid substrate located on the lower side of the grid substrate and extending in the lateral direction, and a pair of vertical frame bones extending in the vertical direction. The lug projects upward from a position shifted to the side close to either one of the pair of vertical frame bones from the longitudinal center of the upper frame bone. The plurality of intermediate bones has a plurality of vertical intermediate bones from the upper frame bone toward the lower frame bone side or from the lower frame bone toward the upper frame bone side and a plurality of lateral intermediate bones from one of the pair of vertical frame bones toward the side of the other one of the pair of vertical frame bones or from the other one of the pair of vertical frame bones toward the side of the one of the pair of vertical frame bones. In the grid substrate, spaces surrounded by the frame bones and the plurality of intermediate bones or spaces surrounded only by the plurality of intermediate bones are present as opening portions.

The positive electrode mixture is charged at least into the opening portions of the grid substrate of the positive electrode current collector. The negative electrode mixture is charged at least into the opening portions of the grid substrate of the negative current collector.

A battery case of the liquid-type lead storage battery is a box type having an opening portion in the upper side. The battery case has a plurality of cell chambers for housing the electrode plate groups. The plurality of cell chambers is separated by partitions. The opening portion of the battery case is sealed with a lid.

In the lid, a metal component (for example, a bushing) forming a terminal is insert-molded. The lid has a communication port (also referred to as a "liquid port") for injecting an electrolyte. The positions and the number of the liquid ports correspond to the positions and the number of the cell chambers of the battery case. The battery case and the lid are formed of acid-resistant resins. Examples of the acid-resistant resins include polypropylene, polyester, and Acrylonitrile Butadiene Styrene (ABS).

As the electrolyte, dilute sulfuric acid around 1.28 is used. Additives, such as aluminum sulphate, are sometimes added to the electrolyte according to performance demanded in the liquid-type lead storage battery.

When a liquid-type lead storage battery with excellent durability is designed, it is necessary to take measures against growth. The growth is a phenomenon in which a positive electrode grid body (grid substrate of the positive electrode current collector) entirely expands or is deformed due to corrosion of the positive electrode grid body. The occurrence of growth poses a risk that the positive electrode grid body is partially curved and broken, and the broken end breaks through the separators to contact the opposing negative electrode plate or expands upward to, for example, contact a part of the negative electrode, such as the negative electrode strap. This contact causes an internal short circuit. Further, the deformation of the positive electrode grid body causes peeling off or dropping of the positive electrode mixture, which also causes an early capacity decrease.

The mechanism by which the growth occurs is considered as follows. The corrosion of the positive electrode grid body in the lead storage batteries, not limited to the liquid type, is caused by an oxidation reaction in which the lead or the lead alloy forming the positive electrode grid body reacts with sulfate ions contained mainly in the electrolyte or the positive electrode mixture and changes into a multilayered corrosion reaction product containing $PbO_x$ (x: 1 to 2), $PbSO_4$, or the like. This corrosion proceeds mainly by the repeated charge and discharge. Particularly on the surface of the positive electrode grid body contacting the sulfate ions, the growth of a layer of the corrosion reaction product is remarkable. The growth of the corrosion reaction product generates a force of pulling and expanding the surface of the positive electrode grid body. On the other hand, the lead alloy in a center portion away from the surface tends to resist the deformation of the surface. Therefore, as the corrosion proceeds, complicated stresses are generated. The deformation starts preferentially from a portion where a difference between the stresses is remarkable. As a result, the positive electrode grid body entirely expands, resulting in the growth.

To prevent the growth, it is effective to suppress the corrosion of the positive electrode grid body and improve the mechanical strength.

A potential distribution of the positive electrode grid body is closely related to the incidence of the corrosion. In a portion far from the lug (a portion close to a corner part formed by the vertical frame bone on the side far from the lug and the lower frame bone: opposite corner area) of the positive electrode grid body, a current path is longer than that in the other parts. As a result, the DC resistance increases based on Ohm's law. Therefore, the polarization in the extraction of a current is small in the vicinity of the lug and large in the opposite corner area. In fact, it is known that the closer it is to the lug, the more likely it is that a large current flows through the positive electrode grid body and that the corrosion proceeds. It is also known that the active material present in the vicinity of the lug is preferentially used for a charge/discharge reaction, and therefore deterioration, such as softening or dropping, of the positive electrode mixture is likely to proceed.

The potential distribution greatly changes depending on the shape or the arrangement of the vertical intermediate bones and the lateral intermediate bones. A potential difference between the vicinity of the lug and the opposite corner area increases as the vertical intermediate bones approach the vertical state or the lateral intermediate bones approach the horizontal state. In other words, as the angle formed by the upper and lower frame bones and the vertical intermediate bones approaches 90° or as the angle formed by each vertical frame bone and each lateral intermediate bone approaches 90°, the potential difference between the vicinity of the lug and the opposite corner area increases.

Therefore, the positive electrode grid body having a simple grid shape in which all the vertical intermediate bones and the lateral intermediate bones are orthogonal to each other has posed a problem that a difference in the proceed of the deterioration among sites in plan view is likely to be large, and the life of the positive electrode grid body is likely to be shortened due to the equilibrium.

To address the problems, JP Patent Publication No. JP 2019-67522 A and JP 2002-42821 A disclose grid for liquid-type lead storage batteries which do not have a simple grid shape.

In a positive electrode grid body illustrated in FIG. 4 of JP Patent Publication No. JP 2019-67522 A, the projecting position of a lug is a position shifted to the right side from the longitudinal center of an upper frame bone, and all vertical intermediate bones are arranged along a diagonal line starting from a certain point on a line extending the center line in the width direction of the lug upward and ending at a lower frame bone or right and left vertical frame bones. The vertical intermediate bones each present on the right side and the left side relative to the above-described reference line have the starting point of the diagonal line located at the upper side as the connection point with the upper frame of each vertical intermediate bone is separated from the lug. As a result, a current path from an opposite corner area to the lug is shorter than that of a positive electrode grid body having a simple grid shape.

Therefore, the resistance is smaller than that in the case of a simple grid shape, so that the in-plane potential distribution is improved. However, in the positive electrode grid body with such a shape, the area of an opening portion increases with an increase in the distance from the lug. As a result, when vibration or impact is applied during in-vehicle use, the active material is likely to drop, and the discharge capacity is reduced corresponding to the amount of the dropping material. The life of the positive electrode grid body is likely to be shortened.

In a grid body disclosed in JP Patent Publication No. JP 2002-42821 A, vertical intermediate bones on the side close to a lug extends perpendicularly to an upper frame bone and a lower frame bone, and the other vertical intermediate bones extend radially (along a plurality of lines spreading from one point) to spread diagonally from the side of a lower frame bone of an opposite corner area toward the side of an upper frame or toward the side of perpendicularly extending vertical intermediate bones. The grid body has seven radially spreading vertical intermediate bones, four of which are directly connected to the upper frame bone and the remaining three of which are directly connected to the perpendicularly extending vertical intermediate bone.

In the liquid-type lead storage battery having the grid body of such a shape, when a large current is extracted for applications, such as starting an engine, a large current is concentrated on the perpendicularly extending vertical intermediate bones close to the lug based on Kirchhoff's first law. As a result, the corrosion rapidly proceeds and the resistance increases in the perpendicularly extending vertical intermediate bones. Then, when the corrosion further proceeds, the vertical intermediate bones may be broken or raptured. In connection therewith, a current extracted from the radially spreading vertical intermediate bones decreases, which may cause a sharp decrease in battery performance.

JP Patent Publication No. JP 6456537 B discloses that, to prevent upward accelerated growth, horizontal bars (lateral intermediate bones) having a large cross-sectional area are arranged in an upper part region of a frame bone on the side opposite to a position where a positive electrode current collecting lug is connected of a first lateral frame bone (upper frame bone).

SUMMARY

It is an object of the present invention to provide a liquid-type lead storage battery with an excellent life property.

A first aspect of the present invention provided to solve the above-described problems is a liquid-type lead storage battery having the following configurations (1) to (4).

(1) The liquid-type lead storage battery includes a cell chamber housing an electrolyte and an electrode plate group, in which the electrode plate group has a laminate containing a plurality of positive electrode plates and negative electrode plates arranged alternately and separators arranged between the positive electrode plates and the negative electrode plates. The positive electrode plate has a positive electrode current collector and a positive electrode mixture containing a positive electrode active material, and the positive electrode active material contains lead dioxide. The positive electrode current collector has a rectangular grid substrate and a lug continuous to the grid substrate. The positive electrode mixture is held in the grid substrate.

(2) The positive electrode current collector is formed of a lead alloy having a rolled structure and the grid substrate has frame bones forming the four sides of the rectangle of the grid substrate and a plurality of intermediate bones connected to the frame bones and present inside the frame bones. The frame bones have an upper frame bone located on the upper side of the grid substrate and extending in the lateral direction, a lower frame bone located on the lower side of the grid substrate and extending in the lateral direction, and a pair of vertical frame bones extending in the vertical direction.

(3) The lug projects upward from a position shifted to a side close to either one of the pair of vertical frame bones from the longitudinal center of the upper frame bone. The plurality of intermediate bones has a plurality of vertical intermediate bones from respective positions of the upper frame bone toward the lower frame bone side and a plurality of lateral intermediate bones connecting the pair of vertical frame bones.

(4) At least one of the plurality of lateral intermediate bones is a thick lateral intermediate bone having a cross-sectional area B larger than an average value A of the cross-sectional areas of the plurality of lateral intermediate bones, and a cross-sectional area ratio B/A is 1.15 or more.

The average value A is the average value of the cross-sectional areas of all the lateral intermediate bones including the thick lateral intermediate bone.

The "positive electrode current collector is formed of a lead alloy having a rolled structure" can be obtained by, for example, applying punching processing or expanding processing to a rolled plate obtained by rolling a lead alloy slab with a multistage rolling mill until a predetermined thickness is reached.

The lateral intermediate bones sometimes have a uniform cross-sectional area in the longitudinal direction of the lateral intermediate bone or sometimes has a cross-sectional area changed in the longitudinal direction, such as a cross-sectional area becoming smaller toward a center part from at least either one of the right frame bone and the left frame bone extending in the vertical direction. When the cross-sectional area is changed in the longitudinal direction as described above, the ratio B/A is calculated using the minimum cross-sectional area value.

A second aspect of the present invention provided to solve the above-described problems is a liquid-type lead storage battery having the configurations (1) to (3) above and the following configurations (5) and (6).

(5) The liquid-type lead storage battery has a plurality of first vertical intermediate bones, which is the vertical intermediate bone extending diagonally from each position of the upper frame bone toward the lower frame bone side to be separated from the position directly under the lug of the lower frame bone. The liquid-type lead storage battery also has a second vertical intermediate bone, which is the vertical intermediate bone arranged closest to a first vertical frame bone. The first vertical frame bone is the vertical frame bone on the side far from the lug and reaching the lower frame bone.

(6) An angle $\theta_L$ formed by a straight line indicating the direction in which the second vertical intermediate bone extends and a straight line indicating the direction in which the first vertical frame bone extends is −10° or more and 10° or less.

The positive/negative of the angle $\theta_L$ is defined as "negative" when the second vertical intermediate bone is directed toward the vertical frame bone (second vertical frame bone) on the side close to the lug and is defined as "positive" when the second vertical intermediate bone is directed toward the first vertical frame bone, as the second vertical intermediate bone is directed from the upper frame bone toward the lower frame bone.

According to the present invention, it can be expected to provide a liquid-type lead storage battery with an excellent life property.

DETAILED DESCRIPTION

Figure 1:
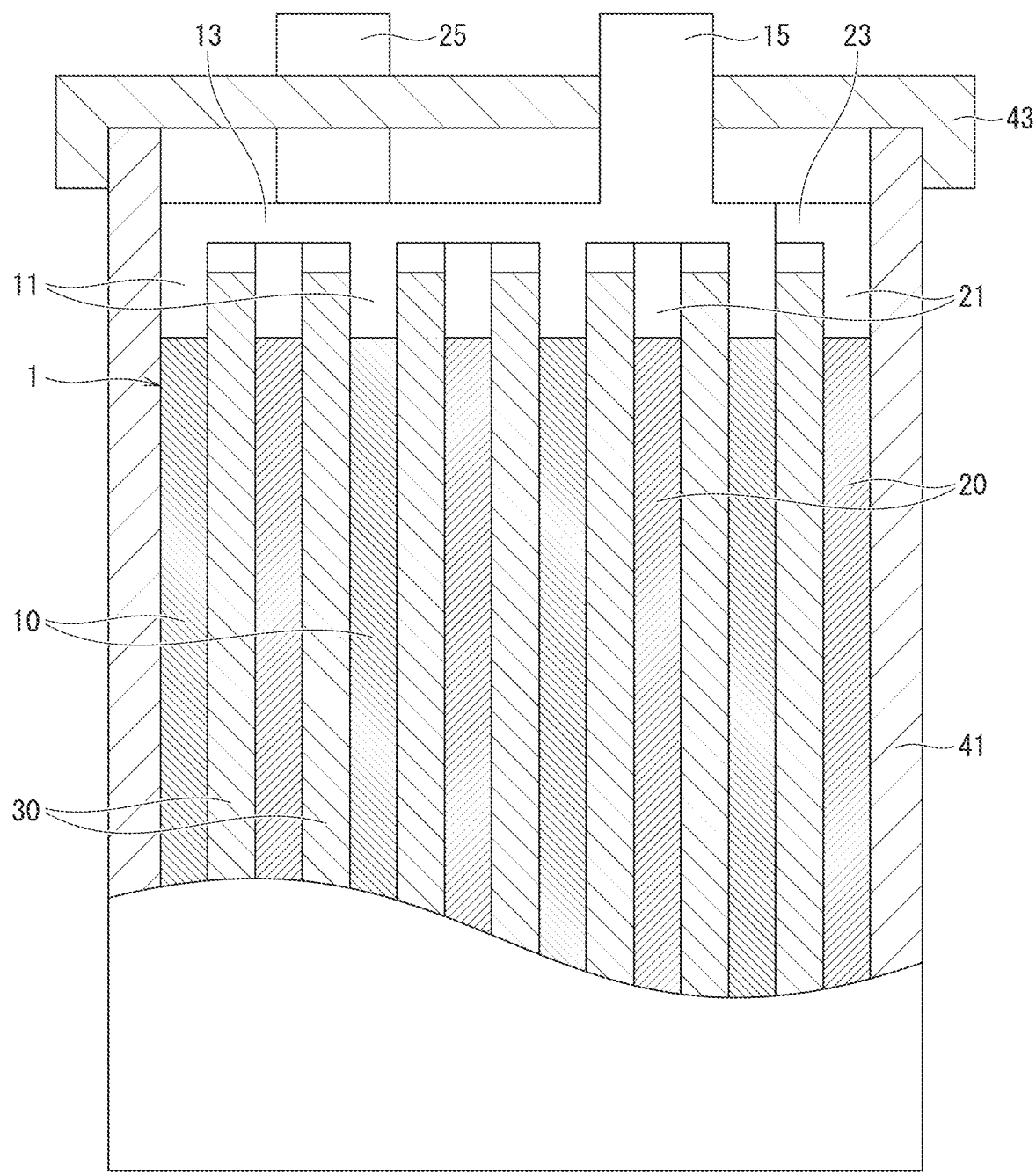
FIG. 1 is a partial cross-sectional view for explaining the structure of a liquid-type lead storage battery according to an embodiment of the present invention.

As disclosed in the examples of JP Patent Publication No. JP 6456537 B (e.g., paragraph 0128), when the positive electrode grid body (grid substrate of the positive electrode current collector) has a vertically long shape in which the dimension in the vertical direction (dimension excluding the lug) is larger than the dimension in the lateral direction, the growth in the vertical direction has been likely to be larger and a contact short circuit with the negative electrode strap on the upper side has been a life factor in many cases.

However, as a result of an examination by the present inventors, it has been found that, when the positive electrode grid body has a laterally long shape in which the dimension in the lateral direction is larger than the dimension in the vertical direction (dimension excluding the lug), the growth in the lateral direction is likely to be larger than the growth in the vertical direction. It has also been found that, when the growth in the lateral direction proceeds, the right and left frame bones of the expanding positive electrode plate sometimes stretch and tear the contacting separators, resulting in that the positive electrodes and the negative electrodes laminated on each other via the separators form a contact short circuit, so that the end of life is reached at an early stage. Even when the separators are not torn, a part of the positive electrode grid body broken by corrosion breaks through the separators, resulting in a contact short circuit with the negative electrode plate, so that the end of life is reached at an early stage in some cases.

A current collector formed of a lead alloy having a rolled structure (for example, obtained by applying punching processing or expanding processing to a rolled plate of a lead alloy) has a rolled structure containing a fine fibrous crystal structure in which crystal grains containing the lead alloy are oriented in a fixed direction. Therefore, the growth caused by corrosion is likely to proceed. On the other hand, it is known that a current collector obtained by casting a lead alloy (cast plate) has a coarse granular crystal structure, and the grain boundaries are preferentially corroded, and therefore the growth is difficult to proceed. A difference in the growth speed is largely affected by the crystal structure (small grain boundaries with active dislocation movement promote creep), and therefore the growth is likely to considerably proceed in the rolled plate as compared with the cast plate.

A grid substrate formed by a casting method or a punching method generally has frame bones thicker than right and left frame bones on the upper side and the lower side. Therefore, an upper part and a lower part have high mechanical strength and are less likely to undergo the elongation in the lateral direction than the elongation in the vertical direction.

On the other hand, the inside of the frame bones, particularly the vicinity of a center part in the up-down direction is provided with intermediate bones relatively thin with respect to the frame bones and is far from the upper and lower frame bones. Therefore, the inside lacks mechanical strength as compared with the upper part and the lower part of the grid substrate. In the case of using such a grid substrate, when a force of expanding the entire electrode plate is generated due to corrosion, a barrel-shaped deformation is observed in which the changes in the upper part and the lower part are small and the changes in the center part are large in the lateral direction. The barrel-shaped deformation occurs more remarkably in the laterally long positive electrode grid body than in the vertically long positive electrode grid body.

The reasons therefor are not clear, but the following reasons are theorized. When the positive electrode active material in the positive electrode mixture charged into the opening portions of the positive electrode grid body expands and contracts due to the charge and discharge, the expansion force and the contraction force are transmitted from the center part toward an outer peripheral part of the positive electrode grid body. A large force is applied to the vicinity of the outer peripheral part due to the sum of the transmitted forces, and further the expansion force and the contraction force are proportional to the volume of the positive electrode active material. In short, when the positive electrode grid body is vertically long, a large expansion force is likely to be generated in the up-down direction, and, when the positive electrode grid body is laterally long, a large expansion force is likely to be generated in the right-left direction. In particular, in the case of the laterally long shape, the barrel-shaped deformation is remarkably observed because the mechanical strength in the center part in the up-down direction is smaller than that in the upper part and the lower part.

Further, it has been found that, when the laterally long positive electrode grid body is continuously used after deformed into the barrel shape as described above, so that the growth proceeds, the deformation of the positive electrode grid body is not limited to the center part. Also, the lower part having mechanical strength lower than that of the upper part is deformed, and the form of the positive electrode grid body is changed from the barrel shape to a mountain shape. Such a deformation into the mountain shape is a new problem to be solved found by the examination of the present inventors and the like on the liquid-type lead storage battery having a life prolonged by suppressing an upper part short circuit by the invention described in JP Patent Publication No. JP 6456537 B.

A difference in the mechanical strength between the upper part and the lower part of the positive electrode grid body is briefly described.

First, in general, it is preferable that the positive electrode grid body is designed to exhibit a uniform potential distribution such that the positive electrode active material is used from the upper part to the lower part during charge and discharge. To achieve the design, a technology is adopted that includes providing a plurality of intermediate bones for reinforcement in the upper part of the positive electrode grid body, for example, for reducing the area of the opening portion in the vicinity of the current collecting lug and increasing the current collection efficiency of the positive electrode active material. On the other hand, because of the need for weight reduction, the intermediate bones for reinforcement are not provided in the lower part of the positive electrode grid body in many cases. Thus, in the upper part of the positive electrode grid body, the density of the intermediate bones is high, so that the mechanical strength is larger than that of the lower part.

In the invention described in JP Patent Publication No. JP 6456537 B, the horizontal bars (lateral intermediate bones) having a large cross-sectional area are arranged in the upper part region of the frame bone on the side opposite to the position where the positive electrode current collecting lug is connected of the first lateral frame bone (upper frame bone) to prevent the upward accelerated growth. Accordingly, the difference in the mechanical strength between the upper part and the lower part of the positive electrode grid body is larger.

As described above, the use of the positive electrode plate having the laterally long grid substrate poses a risk that the grid substrate is deformed into the barrel shape, causing the tearing in the lateral direction of the separators, and forming a contact short circuit with the negative electrode plate.

Operations and Effects of a First Aspect of the Lead Storage Battery

On the other hand, the lead storage battery according to the first aspect of the present invention has the above-described configuration (4) in the lead storage battery having the above-described configurations (1) to (3). More specifically, at least one of the plurality of lateral intermediate bones is the thick lateral intermediate bone having the cross-sectional area B larger than the average value A of the cross-sectional areas of the plurality of lateral intermediate bones. Due to the fact that the cross-sectional area ratio B/A is 1.15 or more, the mechanical strength of the positive electrode plate is improved. Thus, the positive electrode grid body is difficult to elongate in the lateral direction, so that the deformation of the positive electrode grid body (grid substrate of the positive electrode current collector) into the barrel shape or the mountain shape can be suppressed.

More specifically, the installation of at least one thick lateral intermediate bone below a center part in the vertical direction of the positive electrode grid body where the lateral elongation is likely to occur, for example, in the positive electrode grid body, improves the mechanical strength. This improved strength makes it difficult to cause the elongation in the lateral direction, so that the deformation into the barrel shape or the mountain shape of the positive electrode grid body can be suppressed. When the deformation of the positive electrode grid body is prevented, the peeling off or the dropping of the active material is suppressed. In this way, the decrease in the discharge capacity is suppressed and, further, a short life due to corrosion of the grid substrate due to the entrance of the electrolyte into a place where the peeling off or the dropping of the active material has occurred and the accelerated growth can also be prevented.

More specifically, one aspect of the present invention provides a lead storage battery with a long life because the growth caused by the corrosion of the grid substrate is suppressed in the positive electrode current collector containing the rolled plate. Therefore, a short circuit due to a contact between the positive electrode plate and the negative electrode plate is suppressed.

The larger the number of the thick lateral intermediate bones and the larger the cross-sectional area of the thick lateral intermediate bone, the higher the effect of suppressing the deformation, but an increase in the battery weight is incurred. Therefore, from the viewpoint of not hindering the weight reduction of the lead storage battery, the cross-sectional area ratio B/A is preferably set to 1.25 or less.

It has been found that, when the positive electrode grid body is laterally long, the vertical intermediate bones are arranged to extend diagonally from respective positions of the upper frame bone toward the lower frame bone side to be separated from the position directly under the lug of the lower frame bone, and the lug projects upward from the position shifted to the side close to the right frame bone from the longitudinal center of the upper frame bone. The deformation of the left frame bone (first vertical frame bone that is the vertical frame bone on the side far from the lug) promotes the peeling off or the dropping of the positive electrode mixture. A particular focus should be placed on the peeling off or the dropping of the positive electrode mixture charged into the plurality of opening portions adjacent to the left frame bone. For convenience of description, the positive electrode mixture charged into the plurality of opening portions adjacent to the left frame bone is referred to as a left end positive electrode mixture. The opening portions filled with the left end positive electrode mixture are referred to as left end opening portions. The vertical intermediate bone forming the left end opening portions is referred to as a left end vertical bone (vertical intermediate bone farthest from the lug). More specifically, the left end vertical bone in this case is the vertical intermediate bone arranged closest to the left frame bone (first vertical frame bone).

The relationship between the peeling off or the dropping of the left end positive electrode mixture and the shape of the positive electrode grid body is described.

The left end positive electrode mixture is in close contact with the left frame bone like cement and has actions of preventing contact between the left frame bone and the electrolyte and stopping the deformation, such as elongation or curvature, of the left frame bone. Therefore, when the left end positive electrode mixture is peeled off from the left frame bone or is dropped from the left end opening portions, surface corrosion of the left frame bone is not prevented, so that the above-described accelerated growth proceeds. The once peeled-off left end positive electrode mixture does not have the power to stop the deformation of the relevant left frame bone.

The left end positive electrode mixture is more likely to be peeled off/dropped as the opening area of the left end opening portions in plan view is larger. This is because the contact area with the positive electrode grid body per unit volume of the positive electrode mixture decreases. In addition, the more the lead storage battery is operated in the partial state of charge for a case, such as a case where the lead storage battery is mounted in one of the ISS vehicles, the more the left end positive electrode mixture is softened, and therefore the left end positive electrode mixture is more likely to be peeled off/dropped. In particular, vibration applied from the outside during in-vehicle use easily peels off/drops the softened positive electrode mixture.

In the case of the arrangement in which all the vertical intermediate bones are arranged to extend diagonally from respective positions of the upper frame bone toward the lower frame bone side to be separated from the position directly under the lug of the lower frame bone, the farther the positions of the opening portions are from the lug, the larger the area of the opening portions in plan view. Therefore, the area of the left end opening portions farthest from the lug is relatively large, and the left end positive electrode mixture is more likely to be peeled off or dropped as compared with the positive electrode mixture charged into the other opening portions.

From the description above, when the positive electrode grid body has the laterally long shape and has the above-described arrangement of the vertical intermediate bones, the peeling off or the dropping of the charged positive electrode mixture is particularly likely to occur in the left end opening portions, which can cause a shorter life of the liquid-type lead storage battery used in the partial state of charge as in the ISS vehicles.

Operations and Effects of a Second Aspect of the Lead Storage Battery

On the other hand, a liquid-type lead storage battery according to a second aspect of the present invention has the above-described configurations (5) and (6) in the lead storage battery having the above-described configurations (1) to (4). More specifically, it has been found that, by setting the angle $\theta_L$ to −10° or more and 10° or less (i.e., between −10° and 10°, inclusive) even when the lead storage battery is used over a long time in the partial state of charge, the peeling off or the dropping of the positive electrode mixture ("left end positive electrode mixture" described above) arranged in the opening portions ("left end opening portions" described above) is significantly suppressed. The opening portions are formed by the first vertical frame bone (vertical frame bone on the side far from the lug), the second vertical intermediate bone (vertical intermediate bone arranged closest to the first vertical frame bone and reaching the lower frame bone described above), and the pair of lateral intermediate bones (or the lateral intermediate bones and the upper frame bone or the lower frame bone).

From the viewpoint of the effect of prolonging the life, the angle $\theta_L$ is preferably −5° to 5° and more preferably −2° to 3°.

The reasons therefor are not clear but are considered as follows.

It is found that the growth of the first vertical frame bone ("left frame bone" described above) of the positive electrode grid body proceeds in an accelerated manner due to the peeling off or the dropping of the left end positive electrode mixture charged into the left end opening portions. Then, the proceed of the accelerated growth causes the deformation of the left frame bone or the vertical intermediate bones around the left frame bone and accelerates the peeling off or the dropping of the left end positive electrode mixture. Therefore, it can be said that the way of delaying "the first occurrence of the peeling off or the dropping of the left end positive electrode mixture" is the key to prevent the peeling off or the dropping of the left end positive electrode mixture and prolong the life of the liquid-type lead storage battery.

As the angle $\theta_L$ approaches 0, an area difference among the plurality of left end opening portions in the up-down direction becomes smaller in plan view. As described above, the area difference among the opening portions has a positive correlation with the likelihood of the peeling off or the dropping of the positive electrode mixture charged into the opening portions. More specifically, by reducing the area difference among the plurality of left end opening portions in the up-down direction, the first occurrence of the peeling off or the dropping of the left end positive electrode mixture can be delayed.

A minimum separation distance $d_L$ between the first vertical frame bone and the second vertical intermediate bone is 5.0 mm or more and 10.0 mm or less (i.e., between 5.0 mm and 10.0 mm, inclusive). The reasons therefor are as follows.

When the opening area of the left end opening portions is excessively small, it is necessary to increase the pressurizing force in a pressurizing step using a pressurizing roller or the like in a step of charging a positive electrode paste into the positive electrode grid body. When the distance $d_L$ is 5.0 mm or more and 10.0 mm or less, the left end opening portions have an opening area suitable for paste charging. Therefore, the manufacturing cost can be reduced.

The range where the distance $d_L$ is 5.0 mm or more and 10.0 mm or less is a numerical value range particularly suitable for the fluidity of the positive electrode paste of a liquid-type lead storage battery for ISS vehicles. The fluidity of the positive electrode paste changes depending on the density of the positive electrode mixture, reinforcing materials, and conditions of additives. The more emphasis is placed on the durability as the liquid-type lead storage battery, the lower the fluidity of the positive electrode paste tends to be and the larger the pressurizing force required in charging tends to be. From the viewpoint of a further prolonged life, the angle $\theta_L=0$ and $3.0 \text{ mm} \leq d_L \leq 10.0 \text{ mm}$ are particularly preferable.

Embodiments

Embodiments of the present invention are described. The embodiments described below give examples of the present invention, and the present invention is not limited to the embodiments. The embodiments can be variously altered or modified, and aspects to which such alterations or modifications are added can also be included in the present invention.

Entire Configurations of Liquid-Type Lead Storage Batteries of Embodiments

Liquid-type lead storage batteries of a first embodiment, a second embodiment, and a third embodiment include an electrode plate group 1 in which a plurality of positive electrode plates 10 and negative electrode plates 20 are alternately laminated via ribbed separators 30 as illustrated in FIG. 1. The electrode plate group 1 is housed in a cell chamber of a battery case 41 together with an electrolyte (not illustrated) such that the laminating direction is along the horizontal direction (i.e., the plate surfaces of the positive electrode plates 10 and the negative electrode plates 20 are along the perpendicular direction) and immersed in the electrolyte in the cell chamber of the battery case 41. More specifically, the liquid-type lead storage batteries according to the embodiments include the electrode plate group 1 and the battery case 41 having the cell chamber housing the electrode plate group 1 together with the electrolyte, in which one electrode plate group 1 is housed in one cell chamber and the number of the positive electrode plates 10 constituting the electrode plate group 1 is equal to or less than the number of the negative electrode plates 20.

The positive electrode plate 10 has a positive electrode current collector and a positive electrode mixture containing a positive electrode active material, and the positive electrode active material contains lead dioxide. The positive electrode current collector has a rectangular grid substrate and a lug 11 continuous to the grid substrate, and the positive electrode mixture is held in the grid substrate. The negative electrode plate 20 has a negative current collector and a negative electrode mixture containing a negative electrode active material, and the negative electrode active material contains metallic lead. The negative current collector has a rectangular grid substrate and a lug 21 continuous to the grid substrate, and the negative electrode mixture is held in the grid substrate.

The positive electrode mixture and the negative electrode mixture are charged into opening portions of the corresponding grid substrates and are present as mixture layers on both the plate surfaces of the grid substrates.

The positive electrode current collector is described in detail below. The negative current collector constituting the negative electrode plate 20 is formed by a punching method to a lead alloy rolled plate. Examples of manufacturing methods other than the punching method for the positive electrode current collector and the negative current collector include a lead alloy casting method and an expanding method using a lead alloy rolled plate. The separator 30 is a porous film-like body containing resin, glass, or the like, for example, and has a flat plate-shaped base surface and, as necessary, pleated ribs projecting in a direction orthogonal to the plane direction of the base surface.

The lugs 11 of the plurality of positive electrode plates 10 are connected with a positive electrode strap 13. The lugs 21 of the plurality of negative electrode plates 20 are connected with a negative electrode strap 23. The positive electrode strap 13 is connected to one end of a positive electrode terminal 15, the negative electrode strap 23 is connected to one end of a negative electrode terminal 25, and the other end of the positive electrode terminal 15 and the other end of the negative electrode terminal 25 penetrate a lid 43 closing an opening portion of the battery case 41 to be exposed to the outside of a case body of the liquid-type lead storage battery including the battery case 41 and the lid 43.

Positive Electrode Current Collector of the First Embodiment

Figure 2:
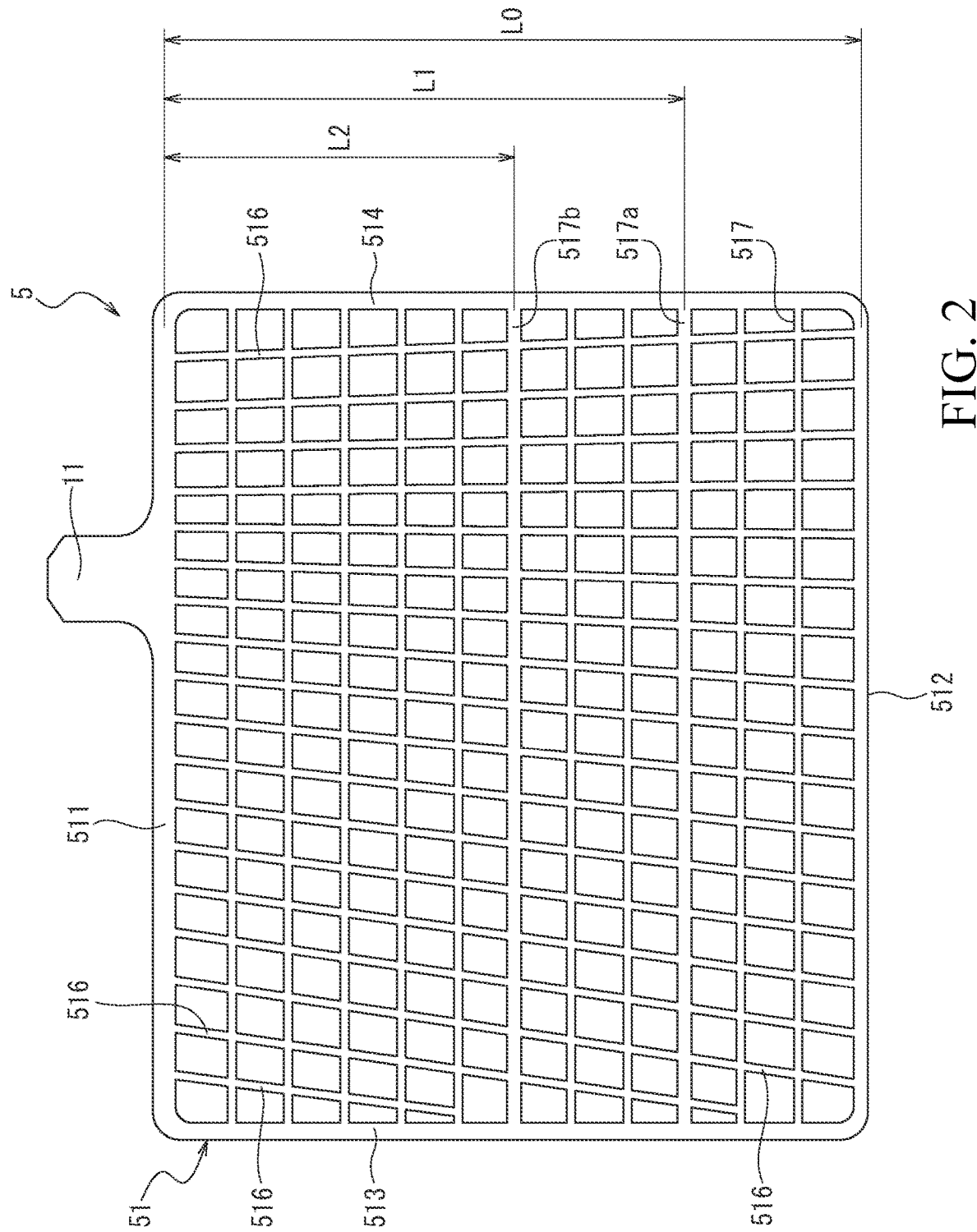
FIG. 2 is a front view illustrating a positive electrode current collector possessed by a liquid-type lead storage battery according to a first embodiment of the present invention.

As illustrated in FIG. 2, a positive electrode current collector 5 constituting the positive electrode plate 10 of the first embodiment is formed by punching processing to a lead alloy rolled plate and has a laterally long rectangular grid substrate 51 and the lug 11 continuous to the grid substrate, and the positive electrode mixture is held in the grid substrate 51. In the positive electrode current collector 5, a stripe-like rolled structure is observed on the cut surface perpendicular to the plate surface. In such a rolled structure, metal crystals in the lead alloy are stretched into a thin layer shape by rolling. Thus, the positive electrode current collector 5 is formed of the lead alloy having the rolled structure.

The grid substrate 51 has frame bones forming the four sides of the rectangle and a plurality of intermediate bones connected to the frame bones and present inside the frame bones.

The frame bones include an upper frame bone 511 located on the upper side of the grid substrate and extending in the lateral direction, a lower frame bone 512 located on the lower side of the grid substrate and extending in the lateral direction, a left frame bone 513 located on the left side of the grid substrate and extending in the vertical direction, and a right frame bone 514 located on the right side of the grid substrate and extending in the vertical direction.

The lug 11 projects upward from a position shifted to the right frame bone 514 side from the longitudinal center of the upper frame bone 511. The plurality of intermediate bones includes a plurality of vertical intermediate bones 516 from respective positions of the upper frame bone 511 toward the lower frame bone 512 side and a plurality of lateral intermediate bones 517 connecting the left frame bone 513 and the right frame bone 514.

In the grid substrate 51, all the vertical intermediate bones 516 are arranged along a diagonal line starting from a certain point on a reference line obtained by extending, upward, a line extending perpendicularly to the lower frame bone 512 on the right side relative to the lug and ending at the lower frame bone 512 or the lateral intermediate bone 517. The vertical intermediate bones present on the right side and the left side relative to the reference line each have the starting point of the diagonal line located on the upper side as the connection points with the upper frame of the vertical intermediate bones are separated from the lug. As a result, a current path from an opposite corner area to the lug is shorter than that of a positive electrode grid body having a simple grid shape.

Two of the plurality of lateral intermediate bones 517 are thick lateral intermediate bones 517a, 517b having a cross-sectional area B larger than an average value A of the cross-sectional areas of the plurality of lateral intermediate bones 517, and a cross-sectional area ratio B/A is 1.15 or more.

The distance between the center position in the vertical direction of the upper frame bone and the center position in the vertical direction of the lower frame bone is defined as L0, and the distance between the center position in the vertical direction of the upper frame bone and the center position in the vertical direction of the thick lateral intermediate bone 517a is defined as L1. A ratio L1/L0 is 0.66. When the distance between the center position in the vertical direction of the upper frame bone and the center position in the vertical direction of the thick lateral intermediate bone 517b is defined as L2 (<L1), a ratio L2/L0 is 0.47.

More specifically, according to the liquid-type lead storage battery of the first embodiment, the grid substrate 51 of the positive electrode current collector 5 constituting the positive electrode plate 10 has the two thick lateral intermediate bones 517a, 517b, the thick lateral intermediate bone 517a being present in a lower half region and the thick lateral intermediate bone 517b being present in the vicinity of a center part in the vertical direction of the grid substrate 51.

Positive Electrode Current Collector of the Second Embodiment

Figure 3:
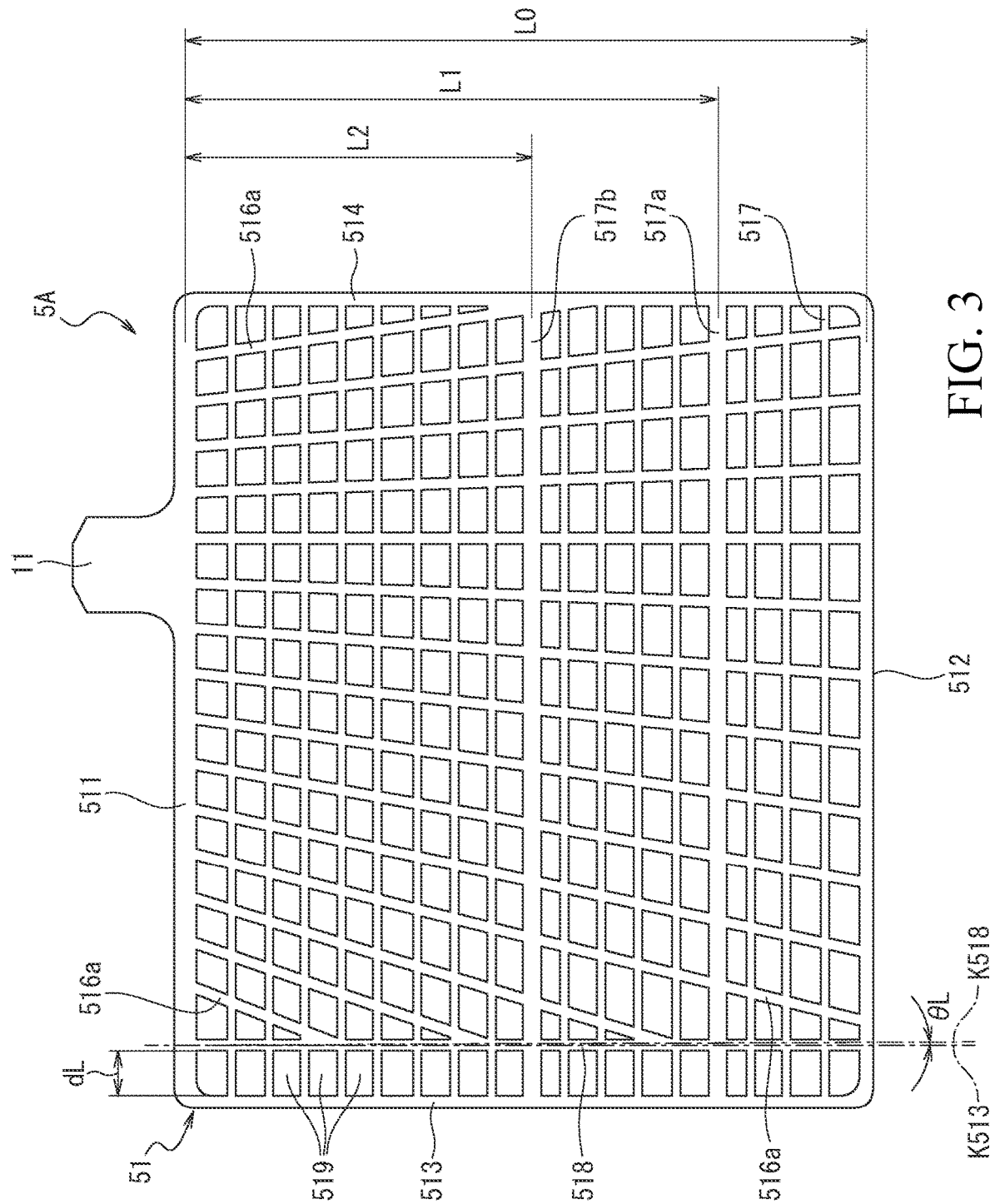
FIG. 3 is a front view illustrating a positive electrode current collector possessed by a liquid-type lead storage battery according to a second embodiment of the present invention.

As illustrated in FIG. 3, a positive electrode current collector 5 constituting a positive electrode plate 10A of a second embodiment is formed by punching processing to a lead alloy rolled plate and has a laterally long rectangular grid substrate 51 and a lug 11 continuous to the grid substrate. A positive electrode mixture is held in the grid substrate 51. In the positive electrode current collector 5, a stripe-like rolled structure is observed on the cut surface perpendicular to the plate surface. In such a rolled structure, metal crystals in the lead alloy are stretched into a thin layer shape by rolling. Thus, the positive electrode current collector 5 is formed of the lead alloy having the rolled structure.

The grid substrate 51 has frame bones forming the four sides of the rectangle and a plurality of intermediate bones connected to the frame bones and present inside the frame bones.

The frame bones include an upper frame bone 511 located on the upper side of the grid substrate and extending in the lateral direction, a lower frame bone 512 located on the lower side of the grid substrate and extending in the lateral direction, a left frame bone 513 located on the left side of the grid substrate and extending in the vertical direction, and a right frame bone 514 located on the right side of the grid substrate and extending in the vertical direction.

The lug 11 projects upward from a position shifted to the right frame bone 514 side from the longitudinal center of the upper frame bone 511. The plurality of intermediate bones includes a plurality of first vertical intermediate bones 516a extending diagonally from respective positions of the upper frame bone 511 toward the lower frame bone 512 side to be separated from the position directly under the lug 11 of the lower frame bone 512, a second vertical intermediate bone 518 arranged closest to the left frame bone 513 and reaching the lower frame bone, and a plurality of lateral intermediate bones 517 connecting the left frame bone 513 and the right frame bone 514.

In the grid substrate 51, the plurality of first vertical intermediate bones 516a is arranged on a diagonal line starting from a certain point on a reference line obtained by extending, upward, a line extending perpendicularly to the lower frame bone 512 on the slightly right side relative to the center in the width direction of the lug and ending at the lower frame bone 512 or the lateral intermediate bone 517. The vertical intermediate bones present on the right side and the left side relative to the reference line each have the starting point of the diagonal line located on the upper side as the connection points with the upper frame of the vertical intermediate bones are separated from the lug. As a result, a current path from an opposite corner area to the lug is shorter than that of a positive electrode grid body having a simple grid shape.

An angle $\theta_L$ formed by a straight line K518 indicating the direction in which the second vertical intermediate bone 518 extends and a straight line K513 indicating the direction in which the left frame bone (first vertical frame bone) 513 extends is $-10°$ or more and $10°$ or less. A minimum separation distance $d_L$ between the left frame bone (first vertical frame bone) 513 and the second vertical intermediate bone 518 is 7.0 mm. The average separation distance between the adjacent lateral intermediate bones 517 is 5.5 mm. The average opening area of a plurality of left end opening portions 519 in plan view is 30 $mm^2$ or more and 104 $mm^2$ or less (i.e., between 30 $mm^2$ and 104 $mm^2$, inclusive).

Two of the plurality of lateral intermediate bones 517 are thick lateral intermediate bones 517a, 517b having a cross-sectional area B larger than an average value A of the cross-sectional areas of the plurality of lateral intermediate bones 517, and the cross-sectional area ratio B/A is 1.15 or more.

The distance between the center position in the vertical direction of the upper frame bone and the center position in the vertical direction of the lower frame bone is defined as L0 and the distance between the center position in the vertical direction of the upper frame bone and the center position in the vertical direction of the thick lateral intermediate bone 517a is defined as L1. A ratio L1/L0 is 0.66. When the distance between the center position in the vertical direction of the upper frame bone and the center position in the vertical direction of the thick lateral intermediate bone 517b is defined as L2 (<L1), a ratio L2/L0 is 0.47.

More specifically, in the liquid-type lead storage battery of this embodiment, the grid substrate 51 of the positive electrode current collector 5 constituting the positive electrode plate 10A has the two thick lateral intermediate bones 517a, 517b, the thick lateral intermediate bone 517a being present in a lower half region and the thick lateral intermediate bone 517b being present in the vicinity of a center part in the vertical direction of the grid substrate 51.

Positive Electrode Current Collector of the Third Embodiment

Figure 4:
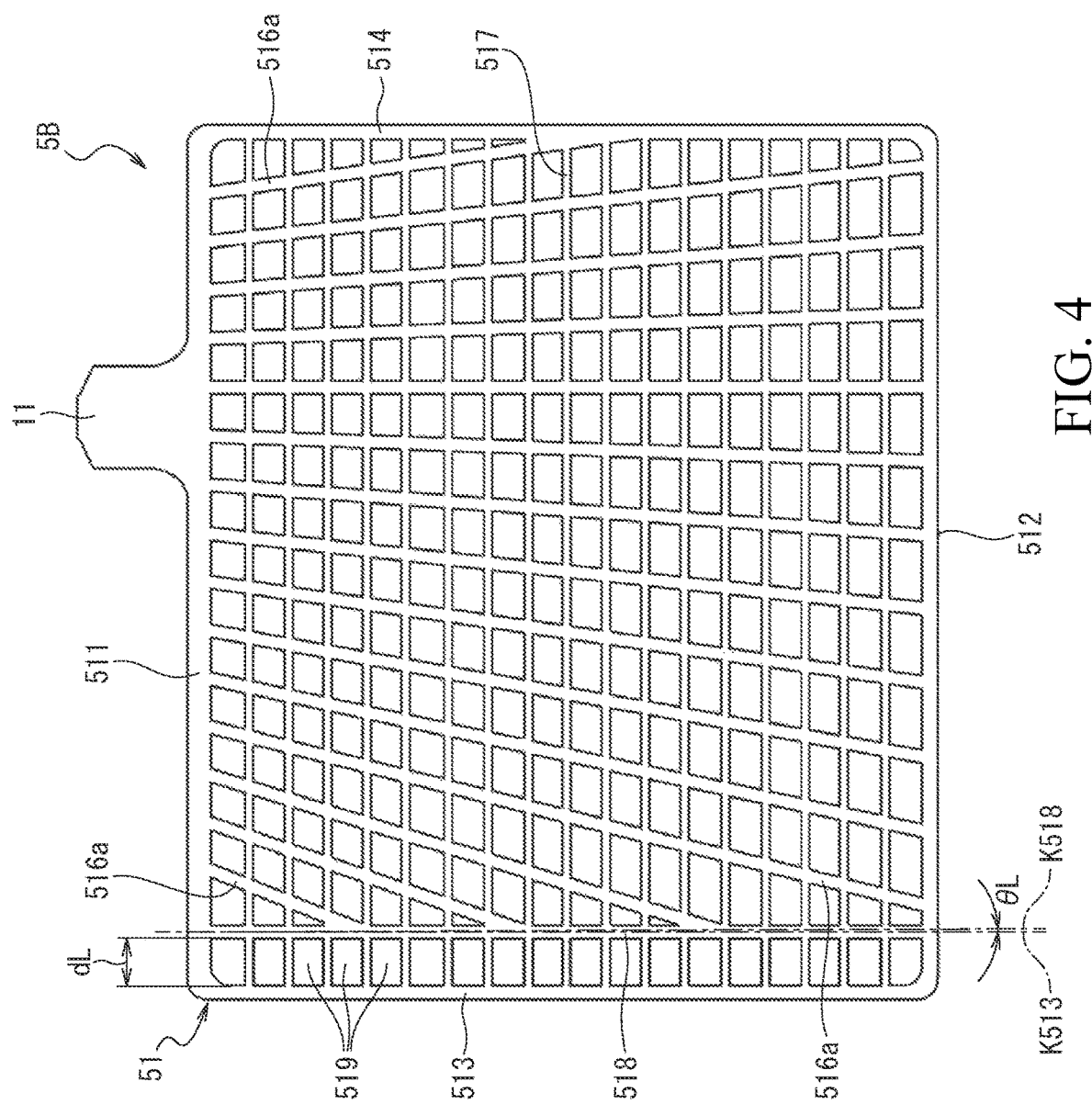
FIG. 4 is a front view illustrating a positive electrode current collector possessed by a liquid-type lead storage battery according to a third embodiment of the present invention.

As illustrated in FIG. 4, a positive electrode current collector 5B constituting a positive electrode plate 10 of a third embodiment is the same as the positive electrode current collector 5A constituting the positive electrode plate 10 according to the second embodiment, except that all lateral intermediate bones 517 have the same thickness.

Operations and Effects of Liquid-Type Lead Storage Batteries of the First to Third Embodiments In the liquid-type lead storage batteries according to the first embodiment and the second embodiment, the grid substrate 51 of each of the positive electrode current collectors 5, 5A constituting the positive electrode plates 10 has the thick lateral intermediate bones 517a, 517b having the ratio B/A of 1.15 or more. Therefore, as compared with a case where all the lateral intermediate bones have the same thickness as that of the lateral intermediate bones 517, the mechanical strength of the positive electrode plate is improved, and the positive electrode plate becomes difficult to elongate in the lateral direction. Accordingly, the deformation into the barrel shape or the mountain shape of the grid substrates 51 of the positive electrode current collectors 5, 5A containing a rolled plate is suppressed. Thus, the growth caused by corrosion of the grid substrate 51 is suppressed, and a short circuit due to the contact between the positive electrode plate and the negative electrode plate is prevented. Life of a battery is prolonged.

The liquid-type lead storage batteries according to the second embodiment and the third embodiment have both the first vertical intermediate bone 516a and the second vertical intermediate bone 518 as the vertical intermediate bones of the grid substrates 51 of the positive electrode current collectors 5A, 5B constituting the positive electrode plates 10, and the angle $\theta_L$ is $-10°$ or more and $10°$ or less. Thus, when the liquid-type lead storage batteries are used over a long time in the partial state of charge, the peeling off or the dropping of the positive electrode mixture arranged in the left end opening portions 519 is remarkably suppressed as compared with a case of having only the first vertical intermediate bone 516a. Further, because the distance $d_L$ is 5.0 mm or more and 10.0 mm or less, in the case of positive electrode pastes of liquid-type lead storage batteries for ISS vehicles, the left end opening portions 519 have an opening area suitable for paste charging. Therefore, the manufacturing cost can be reduced.

Further, in the liquid-type lead storage batteries of the first embodiment to the third embodiment, the vertical intermediate bones 516 of the grid substrate 51 of the positive electrode current collector 5 constituting the positive electrode plate 10 and the first vertical intermediate bone 516a of the grid substrates 51 of the positive electrode current collectors 5A, 5B constituting the positive electrode plates 10 are arranged to extend diagonally from respective positions of the upper frame bone toward the lower frame bone side to be separated from the position directly under the lug of the lower frame bone. Therefore, as compared with a liquid-type lead storage battery including a positive electrode current collector having a simple grid shape, a charge/discharge reaction accompanied by the electrolysis of the electrolyte in a lower part of the positive electrode plate 10 is likely to proceed in constant voltage charge or the like. Thus, the amount of gas generated from the lower part of the positive electrode plate 10 becomes large, and the electrolyte is stirred so that the stratification of the electrolyte is difficult to occur. The softening/dropping of the lower part of the positive electrode plate or the sulfation of the lower part of the negative electrode plate is also suppressed. Further, the liquid-type lead storage batteries according to the first embodiment to the third embodiment each have an excellent discharge capacity because the utilization rate of the positive electrode active material in the positive electrode mixture held in the lower part of the positive electrode plate increases due to the arrangement of the vertical intermediate bones 516 and the first vertical intermediate bone 516a.

Therefore, the liquid-type lead storage batteries of the first embodiment to the third embodiment are suitable as liquid-type lead storage batteries mounted in vehicles controlling the charge, such as charge control vehicles and idling stop vehicles, and mainly used in the partial state of charge. The partial state of charge is a state in which the charge state is more than 70% and less than 100%, for example.

The liquid-type lead storage batteries of the first embodiment to the third embodiment are usable not only as a power source for starting the internal combustion engine of vehicles but as a motive power source or an auxiliary backup power source for electric vehicles, electric forklifts, electric buses, electric motorcycles, electric scooters, small electric mopeds, golf carts, electric locomotives, and the like. Further, the liquid-type lead storage batteries according to the embodiments are also usable as a power source for lighting and a backup power source. Alternatively, the liquid-type lead storage batteries according to the embodiments are also usable as power storage devices for electric energy generated by solar power generation, wind power generation, and the like.

EXAMPLES

The present invention is more specifically described with reference to Examples and Comparative Examples below.
First Comparative Test Liquid-type lead storage batteries (Samples No. 1 to No. 39) having a battery size of Q-85 were produced by the following method. As shown in Tables 1 to 3, the liquid-type lead storage batteries of the samples are different in the configuration of lateral intermediate bones of a positive electrode current collector but are the same except for the difference.

First, current collectors for a positive electrode plate and negative electrode plate (grid substrate+lug) were produced from a Pb—Ca—Sn alloy rolled plate by a punching method. In the cross section of the current collector cut in the thickness direction, a rolled structure with an average interlayer distance of 20 μm was observed.

The liquid-type lead storage battery of Sample No. 1 is a conventional example, and the positive electrode current collector thereof does not include the thick lateral intermediate bones 517a, 517b in the positive electrode current collector 5 in FIG. 2, and all the lateral intermediate bones 517 have the same thickness. The grid substrate 51 of the positive electrode current collector 5 has a width (dimension in the lateral direction) of 137 mm and a height (dimension in the vertical direction) of 116.5 mm. Both the dimensions are not the distances between the centerlines of the frame bones but the distances between the outermost sides. In the positive electrode current collector of Sample No. 1, the cross-sectional areas of all the lateral intermediate bones 517 are 1.00 mm².

In each of the positive electrode current collectors 5 possessed by the liquid-type lead storage batteries of Samples No. 2 to No. 31, one of the plurality of lateral intermediate bones 517 constituting the grid substrate 51 is a thick lateral intermediate bone. The ratio L1/L0 of the distance (distance between the center positions in the vertical direction) L1 between the thick lateral intermediate bone and the upper frame bone 511 to the distance (distance between the center positions in the vertical direction) L0 between the upper frame bone 511 and the lower frame bone 512 is any of 0.40, 0.50, 0.60, 0.70, 0.80, and 0.90.

In the positive electrode current collectors of the samples, the cross-sectional areas of the lateral intermediate bones other than the thick lateral intermediate bone are the same at 1.00 mm². By setting the cross-sectional area B of each of the thick lateral intermediate bone to 1.11 mm², 1.17 mm², 1.22 mm², 1.29 mm², or 1.34 mm², the average value A of the cross-sectional areas of all the lateral intermediate bones including the thick lateral intermediate bone is set to 1.01 mm², 1.02 mm², 1.02 mm², 1.03 mm², or 1.03 mm², and the ratio B/A is set to 1.10, 1.15, 1.20, 1.25, or 1.30.

In the positive electrode current collector 5 possessed by each of the liquid-type lead storage batteries of No. 32 to No. 35, two of the plurality of lateral intermediate bones 517 are thick lateral intermediate bones. One of the two thick lateral intermediate bones is arranged at a position where the ratio L1/L0 of the distance (distance between the center positions in the vertical direction) L1 from the upper frame bone 511 to the distance (distance between the center positions in the vertical direction) L0 between the upper frame bone 511 and the lower frame bone 512 is 0.80. The other one is arranged at a position where the ratio L2/L0 of the distance (distance between the center positions in the vertical direction) L2 (<L1) from the upper frame bone 511 to the distance L0 is any of 0.40, 0.50, 0.60, and 0.70.

In each of the positive electrode current collectors of No. 32 to No. 35, the cross-sectional areas of the lateral intermediate bones other than the thick lateral intermediate bones are the same at 1.00 mm², and the cross-sectional areas B of both the two thick lateral intermediates are 1.26 mm². The average value A of the cross-sectional areas of all the lateral intermediate bones including the thick lateral intermediate bones is 1.05 mm². Thus, the ratio B/A is 1.20.

In the positive electrode current collector 5 possessed by each of the liquid-type lead storage batteries of No. 36 to No. 39, three of the plurality of lateral intermediate bones 517 are thick lateral intermediate bones. Two of the three thick lateral intermediate bones are present in a lower half region from the center part in the vertical direction of the grid substrate 51, and the remaining one is located at a position in an upper half region. The two thick lateral intermediate bones present in the lower half region are arranged at a position where the ratio L1/L0 is 0.80 and at a position where the ratio L2/L0 is 0.60. One thick lateral intermediate bone present in the upper half region is arranged at a position where the ratio L3/L0 is any of 0.10, 0.20, 0.30, and 0.40.

In each of the positive electrode current collectors of No. 36 to No. 39, the cross-sectional areas B of the three thick lateral intermediate bones are all 1.30 mm². The cross-sectional areas of the lateral intermediate bones other than the thick lateral intermediate bones are all the same at 1.00 mm². The average value A of the cross-sectional areas of all the lateral intermediate bones including the thick lateral intermediate bones is 1.08 mm². Thus, the ratio B/A is 1.20.

In the positive electrode current collector, when the cross-sectional areas of the plurality of thick lateral intermediate bones are differentiated from each other, the average cross-sectional area thereof is defined as B and the ratio B/A is determined.

As the negative current collector, one was used that had the same shape as that of the positive electrode current collector 5 illustrated in FIG. 2 and in which all the lateral intermediate bones had the same thickness.

Next, a lead powder containing lead monoxide as a main component was kneaded with water and dilute sulfuric acid, and, as necessary, additives were mixed and kneaded to produce a paste for positive electrode mixture. A ratio α/(α+β) of a mass α of α-lead dioxide and a mass β of β-lead dioxide contained in the positive electrode active material was set to 20%. A lead powder containing lead monoxide as a main component was kneaded with water and dilute sulfuric acid, and, as necessary, additives were mixed and kneaded to produce a paste for negative electrode mixture.

Then, the paste for positive electrode mixture was charged into the grid substrate of the positive electrode current collector, and then aged and dried to produce a positive electrode plate before formation. Similarly, the paste for negative electrode mixture was charged into the grid substrate of the negative current collector, and then aged and dried to produce a negative electrode plate before formation.

The density of the positive electrode active material possessed by the positive electrode plate was 4.2 g/cm³. The density of the negative electrode active material possessed by the negative electrode plate was 4.0 g/cm³.

As the separator, a ribbed separator was prepared which contained a porous synthetic resin and had a flat plate-shaped base surface and pleated ribs projecting in a direction orthogonal to the plane direction of the base surface. The total thickness of the ribbed separators was set to 0.90 mm, the rib height was set to 0.65 mm, and the thickness of the base surface was set to 0.25 mm.

Two or more of the produced positive electrode plate and negative electrode plate before formation were alternately laminated with the ribbed separators interposed therebetween to produce an electrode plate group. The number of the positive electrode plates was set to 7. The number of the negative electrode plates was set to 8.

This electrode plate group was housed in a battery case, the lugs of the positive electrode current collectors of the positive electrode plates were connected with a positive electrode strap, and the lugs of the negative current collectors of the negative electrode plates were connected with a negative electrode strap. Then, the positive electrode strap was connected to one end of a positive electrode terminal and the negative electrode strap was connected to one end of a negative electrode terminal. The battery case has a plurality of cell chambers housing the electrode plate group, but the volume of a portion with a level equal to or below the upper level (highest liquid level) per cell chamber is 570 cm³. The electrode plate group was loaded with a predetermined group pressure.

Further, an opening portion of the battery case was closed with a lid. A positive electrode pole and a negative electrode pole were individually caused to penetrate through a bushing insert-molded in the lid, and were welded in a state where the other end of the positive electrode pole and the other end of the negative electrode pole were exposed to the outside of a lead storage battery, so that the positive electrode terminal and the negative electrode terminal were formed. From a liquid injection port formed in the lid, an electrolyte containing dilute sulfuric acid with a relative density of 1.23 and containing aluminum sulfate at a concentration of 0.1 mol/L was injected to the upper level of the battery case, the liquid port was sealed with a plug body, and then battery case formation was performed, so that a lead storage battery was obtained.

The time from the injection of the electrolyte to the start of energization for the formation (i.e., soaking time) was set to 30 minutes, the amount of electricity for the formation was set to 230%, and the temperature of the electrolyte in the formation was set to 45° C. At this time, the amount of the injected electrolyte was 375 cm³ per cell chamber. The relative density of the electrolyte after the formation was 1.28.

For later dismantling investigation, a plurality of lead storage batteries was produced for each lot, and the lead storage batteries of the same lot were regarded to have the same structure and battery characteristics.

The liquid-type lead storage batteries of Samples No. 1 to No. 39 thus obtained were subjected to a combined life test at 75° C., and they were investigated for the number of cycles until the end of the life.

The conditions of the life test are as follows. First, in a 75° C. environment, a cycle of 300 A discharge for 2 seconds, Constant Current Constant Voltage (CCCV) Charging for 60 minutes (14.5 V, maximum charge current 50 A), 25 A discharge for 5 minutes, and CCCV for 30 minutes (14.5 V, maximum charge current 50 A) was repeated a plurality of times in this order. When the voltage at each discharge dropped to 7.2 V, it was determined that the end of life was reached, and the number of cycles that had been performed up to the moment was defined as the life.

The life test results were evaluated according to the following criteria. A case where the number of cycles is less than 360 was evaluated as "x", a case where the number of cycles is 360 or more and less than 380 was evaluated as "Δ", a case where the number of cycles is 380 or more and less than 400 was evaluated as "○", and a case where the number of cycles is 400 or more was evaluated as "⊚".

The batteries after the life test were subjected to dismantling investigation, and the state of separator tearing (degree of damage) caused by the positive electrode growth was confirmed. With respect to the state of separator tearing, any of the following four states is indicated as the "Separator state" in Table 1.

x: When the base surface of the separator was visually observed, tearing or penetration of the base surface was observed.

Δ: When the base surface of the separator was visually observed, traces of stress application, such as deformation/discoloration, were observed on both sides of the base surface.

○: When the base surface of the separator was visually observed, traces of stress application, such as deformation/discoloration, were observed only on one side of the base surface.

⊚: When the base surface of the separator was visually observed, traces of stress application, such as deformation/discoloration, were not observed.

The liquid-type lead storage battery is demanded to reduce the weight, and thus is in a situation of being requested to reduce the mass by even a few grams. Therefore, the suppression of a battery weight increase was evaluated according to the following criteria.

The mass of the positive electrode current collector in the conventional example is 48.0 g, and a case where an increased amount of the mass based on the mass is less than 0.5 g was evaluated as "⊚", a case where the increased amount of the mass based on the mass is 0.5 g or more and less than 1.0 g was evaluated as "○", a case where the increased amount of the mass based on the mass is 1.0 g or more and less than 1.5 g was evaluated as "Δ", and a case where the increased amount of the mass based on the mass is 1.5 g or more was evaluated as "x".

Further, an overall determination was performed as follows. In the evaluations of "Determination of life test", "Separator state", and "Suppression of weight increase", "⊚" was set to 3 points, "○" was set to 2 points, "Δ" was set to 1 point, and "x" was set to 0 point, and the total points were calculated. A case where the value is 7 or more was evaluated as "⊚", a case where the value is 5 or 6 was evaluated as "○", a case where the value is 4 or 3 was evaluated as "Δ", and a case where the value is 2 or less was evaluated as "x".

These results are shown in Table 1, Table 2, and Table 3. Table 2 also shows the configuration and results of No. 24 as a control, and Table 3 also shows the configuration and results of No. 34 as a control.

TABLE 1

| | Lateral intermediate bones of positive electrode current collector | | | Test results | | Evaluation | |
|---|---|---|---|---|---|---|---|
| | | Thick lateral intermediate bone | | Life (Number of cycles) | Determination of life test | Separator state | Suppression of weight increase | Overall determination |
| No. | B/A | Number of bones | L1/L0 | | | | | |
| 1 | 1.00 | 0 | — | 350 | X | X | | — |
| 2 | 1.10 | 1 | 0.40 | 350 | X | X | ○ | X |
| 3 | 1.15 | 1 | 0.40 | 365 | Δ | X | ○ | Δ |
| 4 | 1.20 | 1 | 0.40 | 370 | Δ | Δ | Δ | Δ |
| 5 | 1.25 | 1 | 0.40 | 379 | Δ | ○ | Δ | Δ |
| 6 | 1.30 | 1 | 0.40 | 381 | ○ | ○ | X | Δ |
| 7 | 1.10 | 1 | 0.50 | 355 | X | X | ○ | X |
| 8 | 1.15 | 1 | 0.50 | 380 | ○ | Δ | ○ | ○ |
| 9 | 1.20 | 1 | 0.50 | 386 | ○ | ○ | Δ | ○ |
| 10 | 1.25 | 1 | 0.50 | 388 | ○ | ○ | Δ | ○ |
| 11 | 1.30 | 1 | 0.50 | 390 | ○ | ○ | X | Δ |
| 12 | 1.10 | 1 | 0.60 | 357 | X | X | ○ | X |
| 13 | 1.15 | 1 | 0.60 | 385 | ○ | Δ | ○ | ○ |
| 14 | 1.20 | 1 | 0.60 | 390 | ○ | ○ | Δ | ○ |
| 15 | 1.25 | 1 | 0.60 | 392 | ○ | ○ | Δ | ○ |
| 16 | 1.30 | 1 | 0.60 | 393 | ○ | ○ | X | Δ |
| 17 | 1.10 | 1 | 0.70 | 359 | X | X | ○ | X |
| 18 | 1.15 | 1 | 0.70 | 388 | ○ | Δ | ○ | ○ |
| 19 | 1.20 | 1 | 0.70 | 392 | ○ | ○ | Δ | ○ |
| 20 | 1.25 | 1 | 0.70 | 395 | ○ | ○ | Δ | ○ |
| 21 | 1.30 | 1 | 0.70 | 395 | ○ | ○ | X | Δ |
| 22 | 1.10 | 1 | 0.80 | 358 | X | X | ○ | X |

TABLE 1-continued

| | Lateral intermediate bones of positive electrode current collector | | | Test results | | | Evaluation | |
|---|---|---|---|---|---|---|---|---|
| | | Thick lateral intermediate bone | | Life (Number of cycles) | Determination of life test | Separator state | Suppression of weight increase | Overall determination |
| No. | B/A | Number of bones | L1/L0 | | | | | |
| 23 | 1.15 | 1 | 0.80 | 381 | ○ | Δ | ○ | ○ |
| 24 | 1.20 | 1 | 0.80 | 388 | ○ | ○ | Δ | ○ |
| 25 | 1.25 | 1 | 0.80 | 391 | ○ | ○ | Δ | ○ |
| 26 | 1.30 | 1 | 0.80 | 392 | ○ | ○ | X | Δ |
| 27 | 1.10 | 1 | 0.90 | 352 | X | X | ○ | X |
| 28 | 1.15 | 1 | 0.90 | 366 | Δ | X | ○ | Δ |
| 29 | 1.20 | 1 | 0.90 | 373 | Δ | Δ | Δ | Δ |
| 30 | 1.25 | 1 | 0.90 | 379 | Δ | ○ | Δ | Δ |
| 31 | 1.30 | 1 | 0.90 | 381 | ○ | ○ | X | Δ |

TABLE 2

| | Lateral intermediate bones of positive electrode current collector | | | | Test results | | | Evaluation | |
|---|---|---|---|---|---|---|---|---|---|
| | | Thick lateral intermediate bone | | | Life (Number of cycles) | Determination of life test | Separator state | Suppression of weight increase | Overall determination |
| No. | B/A | Number of bones | L1/L0 | L2/L0 | | | | | |
| 32 | 1.20 | 2 | 0.80 | 0.40 | 451 | ⊚ | ⊚ | X | ○ |
| 33 | 1.20 | 2 | 0.80 | 0.50 | 462 | ⊚ | ⊚ | X | ○ |
| 34 | 1.20 | 2 | 0.80 | 0.60 | 471 | ⊚ | ⊚ | X | ○ |
| 35 | 1.20 | 2 | 0.80 | 0.70 | 460 | ⊚ | ⊚ | X | ○ |
| 24 | 1.20 | 1 | 0.80 | — | 388 | ○ | ○ | Δ | ○ |

TABLE 3

| | Lateral intermediate bones of positive electrode current collector | | | | | Test results | | | Evaluation | |
|---|---|---|---|---|---|---|---|---|---|---|
| | | Thick lateral intermediate bone | | | | Life (Number of cycles) | Determination of life test | Separator state | Suppression of weight increase | Overall determination |
| No. | B/A | Number of bones | L1/L0 | L2/L0 | L3/L0 | | | | | |
| 36 | 1.20 | 3 | 0.80 | 0.60 | 0.10 | 473 | ⊚ | ⊚ | X | ○ |
| 37 | 1.20 | 3 | 0.80 | 0.60 | 0.20 | 475 | ⊚ | ⊚ | X | ○ |
| 38 | 1.20 | 3 | 0.80 | 0.60 | 0.30 | 476 | ⊚ | ⊚ | X | ○ |
| 39 | 1.20 | 3 | 0.80 | 0.60 | 0.40 | 475 | ⊚ | ⊚ | X | ○ |
| 34 | 1.20 | 2 | 0.80 | 0.60 | — | 471 | ⊚ | ⊚ | X | ○ |

The test results in Table 1 show that, regardless of the difference in the distance ratio L1/L0, when the cross-sectional area ratio (B/A) of the lateral intermediate bones is 1.10, only the performance almost equal to that of the conventional example having the ratio of 1.00 is obtained. It is also found that, in the comparison among those having the same distance ratio L1/L0, there is a tendency that the effect of suppressing the growth in the lateral direction becomes higher, damage to the separator is reduced, and the life cycle is also improved with an increase in the cross-sectional area ratio (B/A) of the lateral intermediate bones, which is 1.15 or more (with an increase in the cross-sectional area of the thick lateral intermediate bone).

Specifically, when the separator state is evaluated as "x", it is considered that the positive electrode plate and the negative electrode plate formed a contact short circuit, so that the life was shortened. When the separator state was evaluated as "Δ", it is considered that the softening or the peeling off of the positive electrode active material proceeded due to an increase in distortion caused by the expansion of the positive electrode plate, which was not able to be visually confirmed. When the separator state is evaluated as "○", it is considered that the distortion caused by the expansion of the positive electrode plate is suppressed and the life property was improved. When the separator state is evaluated as "⊚", it is considered that the effect of suppressing the distortion caused by the expansion of the positive electrode plate was high and the excellent life property was obtained.

Further, with an increase in the cross-sectional area of the thick lateral intermediate bone, the weight (mass) of the grid substrate of the positive electrode current collector increases. Therefore, from the viewpoint of reducing the weight of the liquid-type lead storage battery, the cross-sectional area ratio (B/A) of the lateral intermediate bone is preferably set to 1.25 or less.

It is also found that, in the comparison among the lateral intermediate bones having the same cross-sectional area ratio (B/A), when L1/L0 is 0.50 or more and 0.80 or less, damage to the separator is reduced and the life cycle is also improved, as compared with a case where L1/L0 is 0.40 and 0.90.

The test results in Table 2 shows that, by increasing the number of the thick lateral intermediate bones from one piece to two pieces, damage to the separator is further reduced and the life cycle is further improved.

The test results in Table 3 shows that, by increasing the number of the thick lateral intermediate bones from two pieces to three pieces, the life cycle is still further improved.

Second Comparative Test

Liquid-type lead storage batteries of Samples No. 40 to No. 53 were produced by the same method as the method described in the first comparative test, except for using positive electrode current collectors of No. 40 to No. 53.

In each of the positive electrode current collectors possessed by the liquid-type lead storage batteries of Samples No. 40 to No. 53, one of the plurality of lateral intermediate bones 517 constituting the grid substrate 51 is a thick lateral intermediate bone in the positive electrode current collector 5A in FIG. 3. The ratio L1/L0 of the distance (distance between the center positions in the vertical direction) L1 between the thick lateral intermediate bone and the upper frame bone 511 to the distance (distance between the center positions in the vertical direction) L0 between the upper frame bone 511 and the lower frame bone 512 is 0.70.

In the positive electrode current collectors possessed by the liquid-type lead storage batteries of Samples No. 40 to No. 53, the cross-sectional areas of the lateral intermediate bones other than the thick lateral intermediate bone are all the same and 1.00 mm². By setting the cross-sectional area B of the thick lateral intermediate bone to 1.29 mm² and setting the average value A of the cross-sectional areas of all the lateral intermediate bones including the thick lateral intermediate bone to 1.03 mm², the ratio B/A is set to 1.25.

As shown in Table 4, the liquid-type lead storage batteries of Samples No. 40 to No. 53 are different in the configuration of the left end vertical intermediate bone 518, but are the same except for the difference.

The distances $d_L$ of the positive electrode current collectors of Samples No. 40 to No. 48 are 7.0 mm and the same, but the angle $\theta_L$ of each of the positive electrode current collectors is −15°, −10°, −5°, −2°, 0°, 3°, 5°, 10°, or 15°.

The angles $\theta_L$ of the positive electrode current collectors of Samples No. 49 to No. 53 are 0° and the same, but the distances $d_L$ are 3.0 mm, 5.0 mm, 8.0 mm, 10.0 mm, and 12.0 mm, respectively.

The produced liquid-type lead storage batteries of No. 40 to No. 53 were tested by the same method as the method described in the first comparative test, and the number of cycles until the end of the life was investigated and the separator state was also determined by the same method. The results are shown in Table 4.

TABLE 4

| | Configuration of positive electrode plate | | | | Test results | | Evaluation | |
|---|---|---|---|---|---|---|---|---|
| | B/A of lateral interme- | Thick lateral intermediate bone | | Left end vertical interme- diate bone | Life (Number | Determi- nation of | Separator | Suppres- sion of weight | Overall determi- |
| No. | diate bone | Number of bones | L1/L0 | $\theta_L$ | $d_L$ | cycles) | life test | state | increase | nation |
| 40 | 1.25 | 1 | 0.70 | 15 | 7.0 | 394 | ○ | ○ | △ | ○ |
| 41 | 1.25 | 1 | 0.70 | 10 | 7.0 | 400 | ⊚ | ⊚ | △ | ⊚ |
| 42 | 1.25 | 1 | 0.70 | 5 | 7.0 | 410 | ⊚ | ⊚ | △ | ⊚ |
| 43 | 1.25 | 1 | 0.70 | 3 | 7.0 | 421 | ⊚ | ⊚ | △ | ⊚ |
| 44 | 1.25 | 1 | 0.70 | 0 | 7.0 | 429 | ⊚ | ⊚ | △ | ⊚ |
| 45 | 1.25 | 1 | 0.70 | −2 | 7.0 | 422 | ⊚ | ⊚ | △ | ⊚ |
| 46 | 1.25 | 1 | 0.70 | −5 | 7.0 | 411 | ⊚ | ⊚ | △ | ⊚ |
| 47 | 1.25 | 1 | 0.70 | −10 | 7.0 | 401 | ⊚ | ⊚ | △ | ⊚ |
| 48 | 1.25 | 1 | 0.70 | −15 | 7.0 | 392 | ○ | ○ | △ | ○ |
| 49 | 1.25 | 1 | 0.70 | 0 | 3.0 | 430 | ⊚ | ⊚ | △ | ⊚ |
| 50 | 1.25 | 1 | 0.70 | 0 | 5.0 | 431 | ⊚ | ⊚ | △ | ⊚ |
| 51 | 1.25 | 1 | 0.70 | 0 | 8.0 | 422 | ⊚ | ⊚ | △ | ⊚ |
| 52 | 1.25 | 1 | 0.70 | 0 | 10.0 | 419 | ⊚ | ⊚ | △ | ⊚ |
| 53 | 1.25 | 1 | 0.70 | 0 | 12.0 | 396 | ○ | ○ | | ○ |

The followings are found from the results in Table 4.

In the liquid-type lead storage batteries of Samples No. 40 to No. 48, the distances $d_L$ of the positive electrode current collectors are 7.0 mm and only the angles $\theta_L$ are different. However, by setting the angle $\theta_L$ to −10° or more and 10° or less, excellent life performance of 400 cycles or more can be exhibited, and the separator state is also good. By setting the angle $\theta_L$ to −5° or more and 5° or less, more excellent life performance of 410 cycles or more can be exhibited. By setting the angle $\theta_L$ to −2° or more and 3° or less, still more excellent life performance of 420 cycles or more can be exhibited.

In the liquid-type lead storage batteries of Samples No. 49 to No. 53, the angles $\theta_L$ of the positive electrode current collectors are 0° and only the distances $d_L$ are different. However, by setting the distance $d_L$ to 10.0 mm or less, excellent life performance of 419 cycles or more can be exhibited, and the separator state is also good. However, in the positive electrode current collector having the distance $d_L$ of 3.0 mm of No. 49, it was necessary to increase the pressurizing force when charging the positive electrode paste into the left end opening portions. Thus, considering the manufacturing cost, the distance $d_L$ is preferably 5.0 mm or more and 10.0 mm or less.

Third Comparative Test

Liquid-type lead storage batteries of Samples No. 54 to No. 67 were produced by the same method as the method described in the first comparative test, except for using positive electrode current collectors of No. 54 to No. 67.

The liquid-type lead storage batteries of Samples No. 54 to No. 67 have the positive electrode current collector 5B illustrated in FIG. 4. The liquid-type lead storage batteries of Samples No. 54 to No. 67 are the same as the liquid-type lead storage battery of the first comparative test, except for the difference.

The cross-sectional areas of the plurality of lateral intermediate bones 517 constituting the positive electrode current collector 5B were all the same and herein set to 1.00 mm².

As shown in Table 5, the liquid-type lead storage batteries of Samples No. 54 to No. 67 are different in the configuration of the left end vertical intermediate bone 518, but are the same except for the difference. The liquid-type lead storage batteries of Samples No. 54 to No. 67 are the same as the samples No. 40 to No. 53, respectively, except for the ratio B/A=1.00.

The distances dL of the positive electrode current collectors of Samples No. 54 to No. 62 are 7.0 mm and the same, but the angle θL is −15°, −10°, 5°, 2°, 0°, 3°, 5°, 10°, or 15°.

The angles $\theta_L$ of the positive electrode current collectors of Samples No. 63 to No. 67 are 0° and the same, but the distances dL are 3.0 mm, 5.0 mm, 8.0 mm, 10.0 mm, and 12.0 mm, respectively.

The produced liquid-type lead storage batteries of No. 54 to No. 67 were tested by the same method as the method described in the first comparative test, and the number of cycles until the end of the life was investigated and the separator state was also determined by the same method. The results are shown in Table 5.

TABLE 5

| | Configuration of positive electrode plate | | | Left end | | Test results | | Evaluation | | |
|---|---|---|---|---|---|---|---|---|---|---|
| No. | B/A of lateral intermediate bone | Thick lateral intermediate bone Number of bones | L1/L0 | vertical intermediate bone θL | dL | Life (Number of cycles) | Determination of life test | Separator state | Suppression of weight increase | Overall determination |
| 54 | 1.00 | 0 | — | 15 | 7.0 | 388 | ○ | ○ | ○ | ○ |
| 55 | 1.00 | 0 | — | 10 | 7.0 | 400 | ◎ | ○ | ○ | ◎ |
| 56 | 1.00 | 0 | — | 5 | 7.0 | 405 | ◎ | ○ | ○ | ◎ |
| 57 | 1.00 | 0 | — | 3 | 7.0 | 421 | ◎ | ○ | ○ | ◎ |
| 58 | 1.00 | 0 | — | 0 | 7.0 | 425 | ◎ | ○ | ○ | ◎ |
| 59 | 1.00 | 0 | — | −2 | 7.0 | 408 | ◎ | ○ | ○ | ◎ |
| 60 | 1.00 | 0 | — | −5 | 7.0 | 407 | ◎ | ○ | ○ | ◎ |
| 61 | 1.00 | 0 | — | −10 | 7.0 | 401 | ◎ | ○ | ○ | ◎ |
| 62 | 1.00 | 0 | — | −15 | 7.0 | 374 | Δ | ○ | ○ | ○ |
| 63 | 1.00 | 0 | — | 0 | 3.0 | 410 | ◎ | ○ | ○ | ◎ |
| 64 | 1.00 | 0 | — | 0 | 5.0 | 420 | ◎ | ○ | ○ | ◎ |
| 65 | 1.00 | 0 | — | 0 | 8.0 | 418 | ◎ | ○ | ○ | ◎ |
| 66 | 1.00 | 0 | — | 0 | 10.0 | 406 | ◎ | ○ | ○ | ◎ |
| 67 | 1.00 | 0 | — | 0 | 12.0 | 381 | ○ | ○ | ○ | ○ |

The followings are found from the results in Table 5.

In the liquid-type lead storage batteries of Samples No. 54 to No. 62, the distances dL of the positive electrode current collectors are 7.0 mm and only the angles $\theta_L$ are different. However, by setting the angle $\theta_L$ to −10° or more and 10° or less, excellent life performance of 400 cycles or more can be exhibited, and the separator state is also good. By setting the angle $\theta_L$ to −5° or more and 5° or less, more excellent life performance of 405 cycles or more can be exhibited. By setting the angle $\theta_L$ to −2° or more and 3° or less, still more excellent life performance of 408 cycles or more can be exhibited.

In the liquid-type lead storage batteries of Samples No. 63 to No. 67, the angles $\theta_L$ of the positive electrode current collectors are 0° and only the distances $d_L$ are different. However, by setting the distance $d_L$ to 10.0 mm or less, excellent life performance of 406 cycles or more can be exhibited, and the separator state is also good. However, in the positive electrode current collector having the distance $d_L$ of 3.0 mm of No. 63, it was necessary to increase the pressurizing force when charging the positive electrode paste into the left end opening portions. Thus, considering the manufacturing cost, the distance $d_L$ is preferably 5.0 mm or more and 10.0 mm or less.

Further, the liquid-type lead storage batteries of Samples No. 54 to No. 67 are slightly inferior in the life performance to the liquid-type lead storage batteries of Samples No. 40 to No. 53, which are the same except for the ratio B/A=1.00, respectively, but are advantageous in that the weight increase can be suppressed.

The following is a list of reference signs used in the claims and in this specification.
1 electrode plate group
10 positive electrode plate
20 negative electrode plate
30 separator
41 battery case
5 positive electrode current collector
51 grid substrate
11 lug continuous to grid substrate
511 upper frame bone
512 lower frame bone
513 left frame bone
514 right frame bone
516 vertical intermediate bone
516a first vertical intermediate bone
517 lateral intermediate bone
517a thick lateral intermediate bone
517b thick lateral intermediate bone
518 left end vertical bone (second vertical intermediate bone)
519 left end opening portion

The invention claimed is:

1. A lead storage battery comprising:
a cell chamber housing an electrolyte and an electrode plate group, wherein
the electrode plate group has a laminate containing a plurality of positive electrode plates and negative electrode plates arranged alternately and separators arranged between the positive electrode plates and the negative electrode plates,
the positive electrode plate has a positive electrode current collector and a positive electrode mixture containing a positive electrode active material, the positive electrode active material includes lead dioxide, the positive electrode current collector has a rectangular grid substrate and a lug continuous to the grid substrate, and the positive electrode mixture is held in the grid substrate,
the positive electrode current collector is formed of a lead alloy having a rolled structure,
the grid substrate has frame bones forming four sides of the rectangular grid substrate and a plurality of intermediate bones connected to the frame bones and present inside the frame bones,
the frame bones have an upper frame bone located on an upper side of the grid substrate and extending in a lateral direction, a lower frame bone located on a lower side of the grid substrate and extending in the lateral direction, and a pair of vertical frame bones extending in a vertical direction,
the lug projects upward from a position shifted to a side close to either one of the pair of vertical frame bones from a longitudinal center of the upper frame bone,
the plurality of intermediate bones has a plurality of vertical intermediate bones from respective positions of the upper frame bone toward a side of the lower frame bone and a plurality of lateral intermediate bones connecting the pair of vertical frame bones,
at least one of the plurality of lateral intermediate bones is a thick lateral intermediate bone having a cross-sectional area B larger than an average value A of cross-sectional areas of the plurality of lateral intermediate bones, a cross-sectional area ratio B/A being 1.15 or more,
a plurality of first vertical intermediate bones, which is the vertical intermediate bone extending diagonally from each position of the upper frame bone toward the side of the lower frame bone to be separated from a position directly under the lug of the lower frame bone, and a second vertical intermediate bone, which is the vertical intermediate bone arranged closest to a first vertical frame bone that is the vertical frame bone on a side far from the lug and reaching the lower frame bone, and
an angle $\theta_L$ formed by a straight line indicating a direction in which the second vertical intermediate bone extends and a straight line indicating a direction in which the first vertical frame bone extends is $-10°$ or more and $10°$ or less.

2. The lead storage battery according to claim 1, wherein the thick lateral intermediate bone is present in a lower half region from a center part in a vertical direction of the grid substrate.

3. The lead storage battery according to claim 2, wherein two pieces of the thick lateral intermediate bone are present.

4. The lead storage battery according to claim 2, wherein three pieces of the thick lateral intermediate bone are present.

5. The liquid-type lead storage battery according to claim 1, wherein, when a distance between a center position in the vertical direction of the upper frame bone and a center position in the vertical direction of the lower frame bone is defined as L0 and a distance between a center position in the vertical direction of the upper frame bone and a center position in the vertical direction of the thick lateral intermediate bone is defined as L1, a ratio L1/L0 is 0.50 or more and 0.80 or less.

6. The lead storage battery according to claim 5, wherein two pieces of the thick lateral intermediate bone are present.

7. The lead storage battery according to claim 5, wherein three pieces of the thick lateral intermediate bone are present.

8. The lead storage battery according to claim 1, wherein two pieces of the thick lateral intermediate bone are present.

9. The lead storage battery according to claim 8, wherein three pieces of the thick lateral intermediate bone are present.

10. The lead storage battery according to claim 1, wherein three pieces of the thick lateral intermediate bone are present.

11. The lead storage battery according to claim 1, wherein the angle $\theta_L$ is $-5°$ or more and $5°$ or less.

12. The lead storage battery according to claim 1, wherein a minimum separation distance $d_L$ between the first vertical frame bone and the second vertical intermediate bone is 5.0 mm or more and 10.0 mm or less.

13. A lead storage battery comprising:
a cell chamber housing an electrolyte and an electrode plate group, wherein
the electrode plate group has a laminate containing a plurality of positive electrode plates and negative electrode plates arranged alternately and separators arranged between the positive electrode plates and the negative electrode plates,
the positive electrode plate has a positive electrode current collector and a positive electrode mixture containing a positive electrode active material, the positive electrode active material includes lead dioxide, the positive electrode current collector has a rectangular grid substrate and a lug continuous to the grid substrate, and the positive electrode mixture is held in the grid substrate,
the positive electrode current collector is formed of a lead alloy having a rolled structure, the grid substrate has frame bones forming four sides of the rectangular grid substrate and a plurality of intermediate bones connected to the frame bones and present inside the frame bones, the frame bones have an upper frame bone located on an upper side of the grid substrate and extending in a lateral direction, a lower frame bone located on a lower side of the grid substrate and extending in the lateral direction, and a pair of vertical frame bones extending in a vertical direction, the lug projects upward from a position shifted to a side close to either one of the pair of vertical frame bones from a longitudinal center of the upper frame bone, the plurality of intermediate bones has a plurality of vertical intermediate bones from respective positions of the upper frame bone toward a side of the lower frame bone and a plurality of lateral intermediate bones connecting the pair of vertical frame bones, a plurality of first vertical intermediate bones, which is the vertical intermediate bone extending diagonally from each position of the upper frame bone toward the side of the lower frame bone to be separated from a position directly under the lug of the lower frame bone, and a second vertical intermediate bone, which is the vertical intermediate bone arranged closest to a first vertical frame bone which is the vertical frame bone on a side far from the lug and reaching the lower frame bone are included, and an angle $\theta_L$ formed by a straight line indicating a direction in which the second vertical intermediate bone extends and a straight line indicating a direction in which the first vertical frame bone extends is −10° or more and 10° or less.

14. The lead storage battery according to claim 13, wherein the angle $\theta_L$ is −5° or more and 5° or less.

15. The lead storage battery according to claim 13, wherein a minimum separation distance $d_I$ between the first vertical frame bone and the second vertical intermediate bone is 5.0 mm or more and 10.0 mm or less.

* * * * *